March 31, 1959 — R. MATTHEWS — 2,880,412
RADAR DISPLAY APPARATUS
Filed Sept. 26, 1955 — 3 Sheets-Sheet 2

March 31, 1959 R. MATTHEWS 2,880,412
RADAR DISPLAY APPARATUS

Filed Sept. 26, 1955 3 Sheets-Sheet 3

Inventor
Robert Matthews
By: Mawhinney & Mawhinney
Attorneys

United States Patent Office 2,880,412
Patented Mar. 31, 1959

2,880,412

RADAR DISPLAY APPARATUS

Robert Matthews, London, England, assignor to The Decca Record Company Limited, London, England, a British company Application September 26, 1955, Serial No. 536,722

11 Claims. (Cl. 343—11)

This invention relates to plan position indicator (P.P.I.) types of display apparatus for radar systems. In a P.P.I. display, a time-base trace is rotated on the screen of a cathode-ray tube in synchronism with the rotation of an antenna. It is well-known in such types of display to off-centre the centre of rotation of the time-base from the centre of the screen and the present invention is more particularly concerned with such off-centred displays.

According to this invention, a radar plan position indicator having a cathode-ray tube with the centre of rotation of a rotating time-base display off-centred from the centre of the screen of the tube is characterised in that switching means are provided for interrupting the off-centering voltage or current applied to the deflection means of the cathode-ray tube during the quiescent period of the time-base.

The invention is applicable to apparatus using either electrostatically or electromagnetically deflected cathode-ray tubes. For off-centred displays, the usual practice, however, is to use an electromagnetically deflected tube and to provide separate deflection coils for the rotating time-base and for the off-centering. In this case, the switching means may be arranged in the circuit of the off-centering deflection coil or coils to interrupt the current supplied thereto during the quiescent period of the time-base.

The deflection coils for the display scan may be either fixed or rotatable. The present invention has particular advantages when applied to systems using fixed coils and according to one aspect of the invention, in a radar plan position indicator having an electromagnetically deflected cathode-ray tube with fixed deflector coils, circuit means are provided for feeding to the deflector coils, in addition to the time-base scanning currents, direct current components for off-centering the display, said circuit means including a switching device for interrupting the direct current components during the quiescent period of the time-base. The interruption of the direct current components during the quiescent period of the time base considerably reduces the average current compared with that required in arrangements having constant off-centering deflection currents and will, in general, make it possible to pass the total deflection current through a valve of the time-base generating circuit. The need is thereby obviated for separate deflection coils or separate power supplies for the off-centering circuits.

Conveniently a separate time-base generator is provided for each deflector coil and in this case said switching means may comprise an electronic switch for each time-base generator.

Each deflector coil may be fed from an output valve with which are associated two or more alternative circuits for controlling the current fed by the output valve to the coil, the operation of the alternative circuits being controlled by said switching means. In a simple form, two alternative circuits may be provided one of which generates a saw-tooth current for the radar display scan and the other of which generates a constant current which is fed to the deflector coil for a short period before the start of the scan so that the scan starts in the required off-centering position, the starting current of the saw-tooth being equal to the current previously applied. More generally, however, each alternative circuit, with the output valve, may form a complex wave-form generator.

In one arrangement the output valve has a cathode resistor and each alternative circuit comprises an amplifying valve and circuit means coupling the output of the amplifying valve to the control grid of the output valve, said switching means being arranged to connect a reactive or a purely resistive circuit between the cathode of the output valve and the input grid of the amplifying valve. When a capacitive feed-back circuit is connected, the two valves together with their coupling circuits form a Miller integrator producing a saw-tooth current. As is described in the specification of British Patent No. 679,722 (in which there is described one arrangement of two valves to form a Miller integrator for a radar display system), in a case where each deflector coil is shunted by a damping resistance, to produce a linear saw-tooth current the capacitive circuit between the cathode and the output valve and the grid of the amplifying valve should include a series resistance.

Conveniently all of said amplifying valves associated with a single output valve may have a common cathode resistance. The circuit means coupling the output of the amplifying valve to the control grid of the output valve may comprise one or more amplifying stages. Conveniently this circuit is arranged so that said output valve is conductive when any one of the said valves conducts. The switching may be effected by applying gate-pulses to the grids of each of said amplifying valves. For example, each amplifying valve may have an associated diode, the anode of the diode being connected to the grid of the amplifying valves and means being provided for biasing the cathode of each diode negatively except when the associated amplifying valve is to conduct. To improve the switching action of the diode, for each diode there may be provided a series resistor connected in the grid circuit of the amplifying valve, the anode of the diode being connected directly to the grid of the valve. If the diode is conductive, the low resistance of the diode forms, with this series resistor, an attenuating potentiometer for attenuating any signal applied to the grid of the valve through the resistor. When the diode is off, however, the attenuation may be made negligible with a suitable choice of component values.

The arrangement of the present application is very conveniently used with an interscan bearing system such as is described and claimed in co-pending application Serial No. 536,723, filed September 26, 1955, now Patent No. 2,849,708. For this purpose there may be provided four alternative circuits controlling the current fed by each output valve to its associated deflector coil, one being for the radar display time-base generator, a second for producing the off-centering of the radar display for a short period before the start of each display scan, a third for a bearing marker trace between the display scan and a fourth for producing off-centering of the bearing marker trace for a short period before the start of that trace.

It will be understood that the amount of off-centering can be made adjustable if desired by making suitable components in the alternative circuits adjustable.

The bearing marker trace in the above-described arrangement may be off-centered separately from the radar display trace and thus it is possible to use the bearing marker trace to measure the bearing between two targets seen on the screen of the cathode ray tube.

It will be appreciated that it is possible to have more than one interscan trace and that each of these traces may be separately adjusted both with respect to its origin and its angular direction. Thus it is possible to apply various arbitrary patterns on the screen of the cathode ray tube, for example for marking a course to be followed by a vessel. Such patterns can readily be obtained by providing a number of alternative circuits corresponding to the various lines to be shown on the screen.

With the above-described arrangement the off-centering is effected electronically and in a manner closely associated with the time-base so that there are no separate coils required. This avoidance of separate off-centering coils eliminates all the problems due to interaction between the coils such as commonly occur in display systems using separate deflector coils for off-centering. There are no auxiliary power supplies required and considerable economy of current may be achieved particularly on short scans at a low pulse recurrence frequency.

The following is a description of one embodiment of the invention reference being made to the accompanying drawings in which.

The particular embodiment now to be described is concerned with a radar plan position indicator having a cathode-ray tube display, the deflection of the beam of the cathode ray tube being controlled by four fixed deflector coils arranged in two pairs, the two coils in each pair being on opposite sides of the tube and the two pairs being arranged transversely. As is described and claimed in British Patent No. 679,722, the two coils in each pair may be arranged to produce opposing deflection fields, the resultant of which determines the deflection of the cathode-ray beam. The four deflector coils and their associated circuits are identical and only one will be described. It will be seen however that the invention is equally applicable to a display system having only two fixed deflection coils and associated circuits. In this latter case, each deflector coil would generally be split into two halves, one on either side of the tube.

Figure 1:
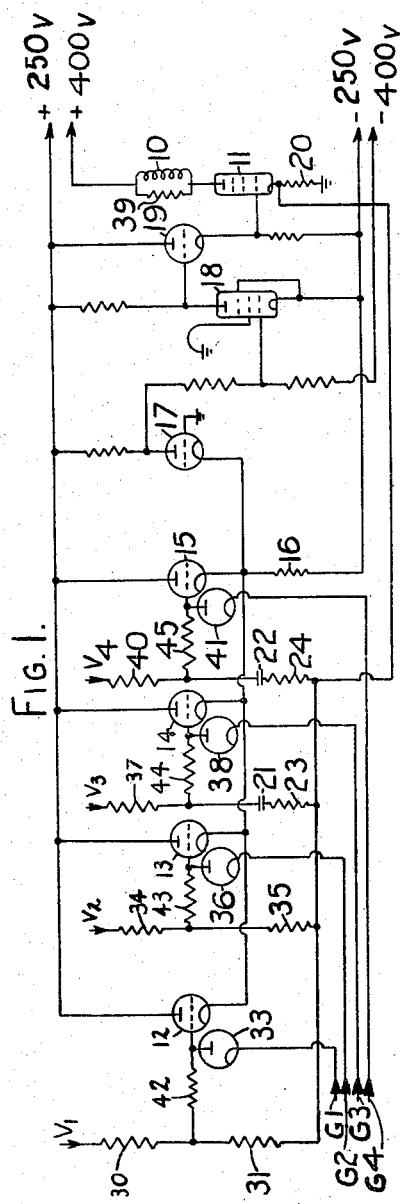
Figure 1 is a circuit diagram of a circuit associated with one of the deflector coils for a plan position indicator display employing an electromagnetically deflected cathode-ray tube with fixed deflector coils.
Figure 3:
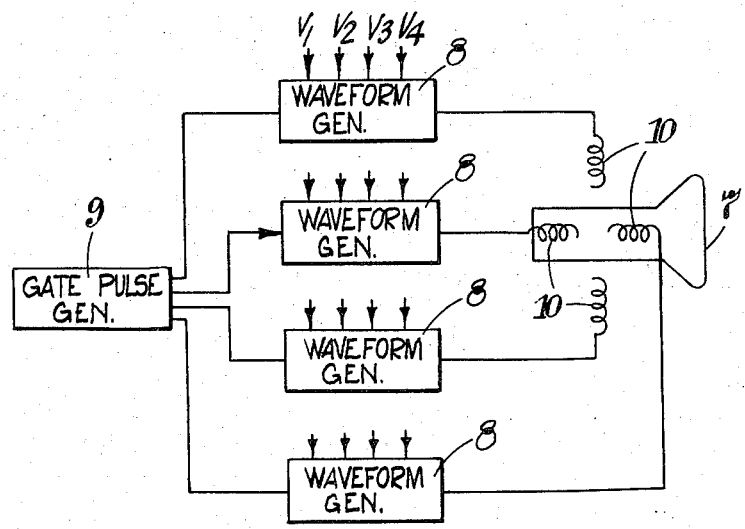
Figure 3 is a block diagram showing part of a plan position indicator display.

Figure 3 illustrates diagrammatically a cathode ray display system having a cathode ray tube 7 associated with 4 waveform generators 8 controlled by a gate pulse generator 9, the waveform generators 8 being coupled respectively to separate fixed deflector coils 10. Figure 1 illustrates in further detail one of the waveform generators 8 with its associated deflector coil 10 and, referring to Figure 1, the deflector coil 10 is connected in the anode circuit of an output valve 11. Four alternative circuits incorporating valves 12 to 15 respectively are provided for controlling the current through the valve 11. Each of the triodes 12 to 17 together with the output valve 11 and its associated circuit forms a complex waveform generator producing a current in the deflector coil 10 the amplitude of which is controlled by the voltage applied to the grid of the triode valve and the waveform of which is determined by the nature of the feed-back circuit from the cathode of valve 11 to the grid of the triode valve. As is described in more detail later, valve 14 when associated with the output valve 11 produces the sawtooth for the scanning for the radar display and valve 15 when associated with valve 11 produces a scanning current for a bearing marker display between the radar display scans. Valves 12 and 13 provide off-centering currents required immediately before the start of the bearing marker trace and radar display trace respectively. The four valves 12 to 15 have a common cathode resistor 16 across which their output is developed and this output after amplification in valves 17 to 19 is applied to the control grid of valve 11.

The amplifier stages formed by valves 17—19 are direct-current connected and the first amplifier valve 17 is arranged as a grounded-grid triode amplifier the output of which is fed to a pentode amplifier 18. The valve 19 is a triode arranged as a cathode follower between the amplifier valve 18 and the current output valve 11 in order to reduce the effect, on the anode load of the pentode amplifier 18, of the input capacitance of the current generator 11.

Valve 11 has a cathode resistor 20 and the voltage developed across this output resistor is fed back to the grid circuits of the valves 12 to 15. The feed-back circuits to valves 12 and 13 are purely resistive but the feed-back circuits to valves 14 and 15 include capacitors 21 and 22 respectively. The capacitive feed-backs to these two latter valves result in these valves together with the output valve 11 forming Miller voltage integrator circuits which will produce saw-tooth currents through the output deflector coil 10. The operation of such a circuit is described in British Patent No. 679,723 and it is not, therefore, proposed to describe it in detail here. The resistors 23, 24 connected in series with condensers 21, 22 respectively are to ensure that a linear output current is obtained although the deflector coil 10 is shunted by a damping resistor 39.

Considering the valve 12, a control voltage $V_1$ is applied to one end of a potentiometer comprising resistors 30 and 31 the junction of which is connected to the grid of valve 12. The resistor 31 forms part of the feed back circuit from the cathode valve 11 and in this case there is a purely resistive feed-back circuit. If $R_1$ and $R_2$ are the resistances of resistors 30 and 31 respectively and $R_k$ is the resistance of resistor 20, then the anode current of valve 11 developed when a control voltage $V_1$ is applied would be $$V_1 \cdot \frac{R_2}{R_1} \cdot R_k$$

Figure 2:
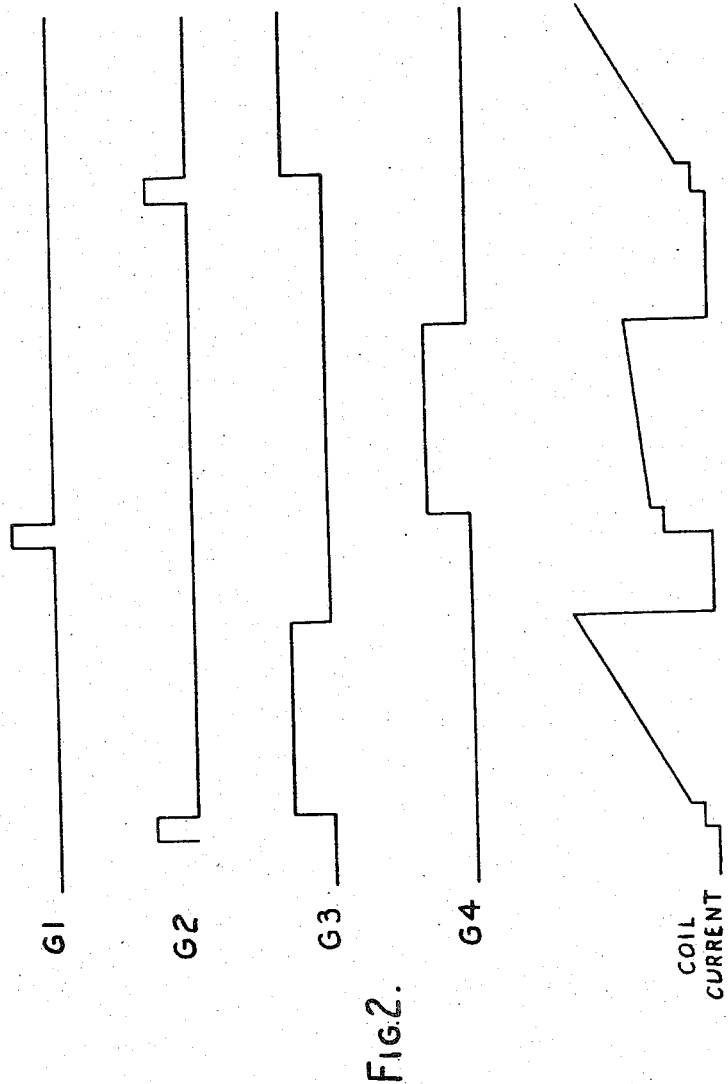
Figure 2 is a diagram illustrating some of the waveforms in the circuit of Figure 1.

The operation of the triode 12 is controlled by a gate pulse $G_1$ having a waveform as shown in Figure 2, this pulse being applied to the grid of valve 12 through a diode 33. Normally a negative bias, which in one typical embodiment is minus 120 volts, is applied to the grid of valve 12. The gate pulse $G_1$ is a positive-going pulse which, in a typical case, may go up to ten volts positive so making the triode 12 conductive during the period of this pulse. When the triode 12 conducts, assuming the other triodes 13 to 15 are non-conductive, the valve 11 will pass through the coil 10 a constant current of magnitude proportional to the amplitude of the applied voltage $V_1$ as stated above.

The circuit of triode 13 is similar to that of triode 12, a control voltage $V_2$ being applied to one end of a potentiometer formed by resistors 34, 35 of magnitudes $R_3$ and $R_4$ respectively. A gate pulse $G_2$ of the form shown in Figure 2 is applied to the grid of valve 13 through a diode 36, this gate pulse removing the normal bias from the valve to make it conductive in a similar manner to valve 12. If valve 13 alone is conductive the anode current of valve 11 is given by expression $$V_2 \cdot \frac{R_4}{R_3} \cdot R_k$$

The control voltage $V_3$ for valve 14 is applied to one end of a potentiometer chain which comprises a resistor 37 in series with the aforementioned condenser 21 and resistor 23. Valve 14 is controlled by a gate pulse $G_3$ of the form shown in Figure 2, this gate pulse being applied through a diode 38 to the grid of valve 14. The condenser 21 and resistance 23 are in the feed-back path from the cathode of the output valve 11 and, due to this capacitive feed-back connection, the control voltage $V_3$ will produce a saw-tooth current waveform through the coil 10 of the output valve 11. If $R_5$ and $R_7$ are the magnitudes of resistors 37 and 23 respectively and $C_6$ is the capacity of the condenser 21 then the magnitude of the anode current $i_3$ of valve 11 dependent on time $t$ is given by the expression $$i_3 = V_3 \left( \frac{R_7}{R_5} + \frac{t}{R_5 C_6} \right)$$

assuming that valve 14 is the only one of the triodes 12—15 which is operative. It will be noted that this current comprises a saw-tooth current superimposed upon a fixed current, this being necessary to compensate for the current through a damping resistor 39 which is shown connected in shunt across the coil 10.

The circuit of valve 15 is similar to that of valve 14, a control voltage $V_4$ being applied to one end of a potentiometer comprising a resistor 40 in series with the above-mentioned condenser 22 and resistor 24. The operation of valve 15 is controlled by a gate pulse $G_4$ of the form shown in Figure 2, this gate pulse being applied through a diode 41 to the grid of valve 15. If $R_8$ and $R_9$ are the resistances of resistors 40 and 24 respectively and $C_9$ is the capacity of condenser 22, then the anode current $i_4$ of valve 11, when valve 15 is the only one of the triodes 12—15 which is operative is given by the expression $$i_4 = V_4 \left( \frac{R_{10}}{R_8} + \frac{t}{R_8 C_9} \right)$$

The control voltages are applied to the grids of valves 12—15 through series resistors 42—45 respectively, the resistors being provided to improve the switching action of the diodes. When one of the diodes is conductive, the low resistance of the diode, in conjunction with the resistor, forms an attenuator for attenuating any signal applied to the grid of the associated triode. By suitable choice of component values the attenuation may be made negligible when the diode is off.

As seen from Figure 2, the four valves 12 to 15 are controlled by their respective gate pulses so as to operate sequentially. During the period of pulse $G_1$, constant current flows through the coil 10 and valve 11 to produce an off-centering of the trace preparatory to the start of the saw-tooth controlled by gate pulse $G_4$ which saw-tooth is the bearing marker trace. After the end of this saw-tooth, the valve 11 is cut off until gate pulse $G_2$ produces a constant current for off-centering the trace preparatory to the start of the saw-tooth controlled by gate pulse $G_3$ for the radar display. The waveform of the resultant current through the coil 10 is shown at the bottom of Figure 2.

The use of the above described pulsed off-centering system enables considerable economies to be made. Considering a typical case in which the full scale deflection current is about 100 milliamperes and in which the inductance of the deflector coil is about 100 millihenries, and assuming a pulse recurrence frequency of 1 kc./s., for a long-range display having a scanning time of 960 micro-seconds (a range of about 80 nautical miles), the voltage drop across the coil, which is the product of the inductance and the rate of change of current is about 10 volts. For a short-range display having a scanning time of 60 micro-seconds (about 5 nautical miles) the voltage drop across the coil is about 166 volts.

If the anode to cathode voltage to obtain a current of 100 milliamperes is 100 volts, then an H.T. voltage of 110 would be necessary for the long-range display and 266 volts for the short-range display (ignoring, for simplicity, the voltage drop across the resistor 20). The higher voltage must be provided and, if the trace is off-centered to the edge of the screen, that is to say 100 milliamperes of off-centering current are required, then without pulsed off-centering, 26.6 watts would be dissipated for this purpose. With the arrangement of the present application this current would only be required for a fraction of the time and the saving in power, particularly on the short-range display is very great.

The arrangement described above has the further advantage that slow period heating and cooling of the current generator valve, as the amplitude of the scan increases and decreases, is minimised due to feedback, thereby reducing the spot-wander which is a serious drawback of prior off-centering systems.

I claim:
1. In a cathode ray tube indicator system having a cathode ray display tube; the combination of waveform generating means for generating sawtooth scanning signals for effecting radial deflection of the cathode ray beam with quiescent periods between successive scans, off-centering signal generating means for providing off-centering signals for off-centering the start of each radial trace, and switching means arranged to interrupt said off-centering signals during said quiescent periods.

2. In a radar plan position indicator having a cathode ray tube; the combination of deflector means for the cathode ray tube, sawtooth waveform generating means coupled to said deflector means for effecting radial scanning of the cathode ray beam with quiescent periods between successive scans, off-centering signal generating means coupled to said deflector means for feeding off-centering signals to said deflector means, and switching means arranged to interrupt the off-centering signals during said quiescent periods.

3. In a radar plan position indicator having a cathode ray tube, the combination of fixed deflector coils for the cathode ray tube, sawtooth current generators coupled to said coils for effecting radial deflection of the cathode ray beam with quiescent periods between the successive scans, off-centering signal generating means coupled to said coils for passing direct current components through said coils for off-centering the point of start of the radial traces on the screen of the tube, and switching means for interrupting said direct current components during said quiescent periods.

4. In a radar plan position indicator having a cathode ray tube with a radially scanned repetitive trace with quiescent periods between successive scans, the combination of a deflector coil, a direct current signal generator coupled to said deflector coil for passing an off-centering current through the coil to off-center the start of the radial display traces, and switching means controlling said signal generator to interrupt the direct current through the coil during said quiescent periods.

5. In a radar plan position indicator having a cathode ray display tube with fixed deflector coils; the combination with each deflector coil of a complex waveform generator including electronic switches switchable to cause the generator to produce either a sawtooth current waveform through said coil or a constant current through said coil, and switch control means arranged to control said electronic switches in sequence so that, after the waveform generator has produced a sawtooth current waveform, there is firstly a quiescent period with no current through the deflector coil and secondly a period when a constant current is passed through the coil preparatory to the start of the sawtooth waveform.

6. In a radar plan position indicator having a cathode ray display tube with fixed deflector coils; the combination with each deflector coil of a separate time base generator connected to that coil to feed a sawtooth current therethrough with quiescent periods between each sawtooth, circuit means for feeding a direct current component to each deflector coil and electronic switches for interrupting the direct current components during the quiescent period of the time base generators.

7. In a cathode ray tube indicator system having fixed deflector coils for deflecting the cathode ray beam; the combination with a deflector coil of an output tube connected to the coil to feed current thereto, and at least two alternative circuits switchable into operation by electronic switches for controlling the current fed by the tube to the coil, one of which circuits comprises an amplifier with a resistive input and with a capacitive feedback from the output tube to the amplifier input to produce a sawtooth waveform and the other of which circuits comprises an amplifier with a resistive input and with a resistive feedback from the output tube to the amplifier input to produce a steady current through a deflector coil.

8. The combination as claimed in claim 7 wherein there are provided switch control means controlling said electronic switches in sequence so that, after a sawtooth waveform, there is firstly a quiescent period with no current through the deflector coil and secondly a period when a constant current is passed through the coil preparatory to the start of the sawtooth waveform.

9. The combination as claimed in claim 7 wherein each deflector coil is shunted by a damping resistance and wherein said capacitive feedback path includes a series resistor.

10. In a radar plan position indicator having a cathode ray tube with fixed deflector coils; the combination with each deflector coil of an output tube having at least a plate, a control grid and a cathode, circuit means connecting the plate of the output tube to the coil to pass current thereto, a plurality of amplifying tubes each having at least a plate, a control grid and a cathode, separate resistive input circuits to the control grids of each said amplifying tubes, circuit means coupling the outputs at the plates of all said amplifying tubes to the control grids of said output tube, a cathode resistor connected in a cathode circuit from said output tube, separate feedback circuits for feeding the voltage developed across said cathode resistor to the control grids of each of said amplifying tubes, of which feedback circuits at least one is purely resistive and at least another is capacitive, a plurality of diode switching tubes associated respectively with the various amplifying tubes and each having a plate and a cathode, circuit means connecting the plates of the diodes to the control grids of the associates amplifying tubes and gate pulse generating means arranged to feed switching pulses to the cathodes of the diodes in sequence so that not more than one amplifying tube is conductive at any one time.

11. In a radar plan position indicator having a cathode ray tube with fixed deflector coils; the combination with each deflector coil of an output tube arranged to feed current through the coil, four alternative circuits coupled to said output tube for controlling the current fed to said coil, one producing a sawtooth current in the output tube for a radar display time-base scan, a second producing a constant current in the output tube for a short period immediately before the start of the radar display scan, a third producing a bearing marker scan between the display scans and a fourth producing a constant current in the output tube for a short period immediately before the start of the bearing marker scan, four electronic switches for rendering said four alternative circuits respectively operative and gate pulse generating means arranged to operate said electronic switches in sequence.

References Cited in the file of this patent
UNITED STATES PATENTS
2,640,984    Sherwin _____ June 2, 1953